United States Patent
Madala et al.

(10) Patent No.: US 12,468,817 B2
(45) Date of Patent: Nov. 11, 2025

(54) VULNERABILITY PROOFING CONTAINER ORCHESTRATION PLATFORM DEPLOYMENT

(71) Applicant: Dell Products L.P., Round Rock, TX (US)

(72) Inventors: Raveendra Babu Madala, Agiripalli (IN); Santosh Gore, Bangalore (IN); Parmeshwr Prasad, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 74 days.

(21) Appl. No.: 18/420,963

(22) Filed: Jan. 24, 2024

(65) Prior Publication Data

US 2025/0238522 A1    Jul. 24, 2025

(51) Int. Cl.
*G06F 21/57* (2013.01)
*H04L 9/32* (2006.01)

(52) U.S. Cl.
CPC .......... *G06F 21/577* (2013.01); *H04L 9/3247* (2013.01)

(58) Field of Classification Search
CPC .............................. G06F 21/577; H04L 9/3247
See application file for complete search history.

(56) References Cited

U.S. PATENT DOCUMENTS

| | | | |
|---|---|---|---|
| 11,374,958 B2 * | 6/2022 | Ngo | H04L 63/10 |
| 2007/0271360 A1 * | 11/2007 | Sahita | H04L 63/1433 709/223 |
| 2008/0271025 A1 * | 10/2008 | Gross | G06F 21/577 718/102 |
| 2009/0106844 A1 * | 4/2009 | Yoon | H04L 41/08 726/25 |
| 2010/0024035 A1 * | 1/2010 | Wallace | G06F 21/577 726/25 |
| 2019/0102564 A1 * | 4/2019 | Li | G06N 3/04 |
| 2019/0138732 A1 * | 5/2019 | Hong | G06F 21/577 |
| 2023/0097733 A1 * | 3/2023 | Nelson | G06F 21/577 726/25 |

* cited by examiner

*Primary Examiner* — Darren B Schwartz
(74) *Attorney, Agent, or Firm* — Fogarty LLP

(57) ABSTRACT

Vulnerability proofing container orchestration platform deployment includes a remote access controller detecting a container orchestration platform installer comprising vulnerability management service instructions and executing the vulnerability management service instructions. This causes the remote controller to identify configurations for one or more of the hardware component(s) of the IHS in the container orchestration platform installer, access a plurality of catalogs specifying known vulnerabilities of hardware components and determine whether the hardware component configuration(s) in the container orchestration platform installer are identified as vulnerable in one or more of the catalogs. The remote controller blocks use of the container orchestration platform installer by the IHS until the hardware component configurations within the container orchestration platform installer are modified to include no configurations with vulnerabilities identified in the plurality of catalogs.

20 Claims, 6 Drawing Sheets

VULNERABILITY PROOFING CONTAINER ORCHESTRATION PLATFORM DEPLOYMENT

FIELD

The present disclosure relates generally to Information Handling Systems (IHSs), relates more particularly to preventing IHSs from being configured with known vulnerabilities, and relates specifically to vulnerability proofing container orchestration platform deployment.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise-class servers that are stacked and installed within racks. A data center may include large numbers of such racks that may be organized into rows, where the servers installed in each rack may be outwardly very similar looking, such that it may be difficult for administrators to effectively keep track of the configurations of any individual server in the data center. Moreover, administration of such large groups of servers may require teams of remote and local administrators working in shifts in order to support around-the-clock availability of the data center operations, while also minimizing any downtime.

Each server IHS within a data center may support a wide variety of possible hardware and software configurations. For instance, a server IHS may be manufactured accordingly to customized hardware and software configurations requested by a customer. In addition, upon manufacture and delivery to a customer, a received server may be provisioned for deployment according to the particular requirements of that customer. Additionally, throughout the lifetime of a server, replaceable hardware components of the server may be added, removed and repaired. Software and firmware may also be updated regularly as part of routine maintenance, to correct errors and/or to adapt the functionality of a server IHS to a specific computing task.

In some instances, these various configurations of a server IHS may themselves render the server vulnerable, even in scenarios where the configurations are intended as updates to the hardware and/or software of the server. Even though these configurations may be updated, the configurations may nonetheless be known to exhibit various types of known vulnerabilities, such as security vulnerabilities that can exploited by malicious actors and such as functional vulnerabilities that can result in errors or failures. Despite these vulnerabilities being publicly known, the administrator making the configuration changes may be unaware of these vulnerabilities, thus rendering the server configuration as vulnerable from the outset. Such issues may be exacerbated by the differing protocols and procedures that may be used in the administration of a server IHS throughout its lifetime. As different administrators configure a server according to changing policies, inconsistent configuration of the server tends to result in the server becoming increasingly vulnerable.

SUMMARY

In various embodiments, Information Handling System (IHSs) may include one or more CPUs utilizing one or more buses that connect to a plurality of hardware components of the IHS, and a remote access controller supporting remote management of the IHS, the remote access controller comprising a logic unit and a memory device having instructions stored thereon. Upon execution by the logic unit the program instructions cause the remote access controller to . . . detect a container orchestration platform installer comprising vulnerability management service instructions and execute the vulnerability management service instructions. This causes the remote controller to identify configurations for one or more of the hardware component(s) of the IHS in the container orchestration platform installer, access a plurality of catalogs specifying known vulnerabilities of hardware components and determine whether the hardware component configuration(s) in the container orchestration platform installer are identified as vulnerable in one or more of the catalogs. The remote controller blocks use of the container orchestration platform installer by the IHS until the hardware component configurations within the container orchestration platform installer are modified to include no configurations with vulnerabilities identified in the plurality of catalogs.

In some implementations, the catalog(s) include a catalog of hardware component vulnerabilities known to a manufacturer of the IHS and the catalog(s) may include a catalog of hardware component vulnerabilities known to (a) manufacturer(s) of the hardware components of the IHS. The configurations of the container orchestration platform installer may include (a) firmware update(s) for instructions used to operate one of the hardware components, and the vulnerability catalogs may specify an alternate firmware version that is used to operate the hardware component and that are not associated with known vulnerabilities. The vulnerability catalogs may also specify workload configurations with alternate firmware versions that are not associated with known vulnerabilities.

In some implementations, execution of the vulnerability management service instructions further causes the remote access controller to identify, within a factory provisioned identity certificate of the IHS, (a) vulnerability proofing requirement(s) for the IHS. The factory-provisioned identity certificate may include digital signatures for authenticating instructions used by one or more of the hardware components of the IHS, and/or the factory-provisioned identity certificate may be cryptographically bound to the remote access controller of the IHS. Further, the validation proofing requirement(s) in the inventory certificate may further specify the catalog(s) of known vulnerabilities for use in identifying (a) hardware component configuration(s) that are vulnerable.

In some implementations, execution of the instructions further causes the remote access controller to notify an administrator for each blocked use of the container orchestration platform installer due to configurations with vulnerabilities.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
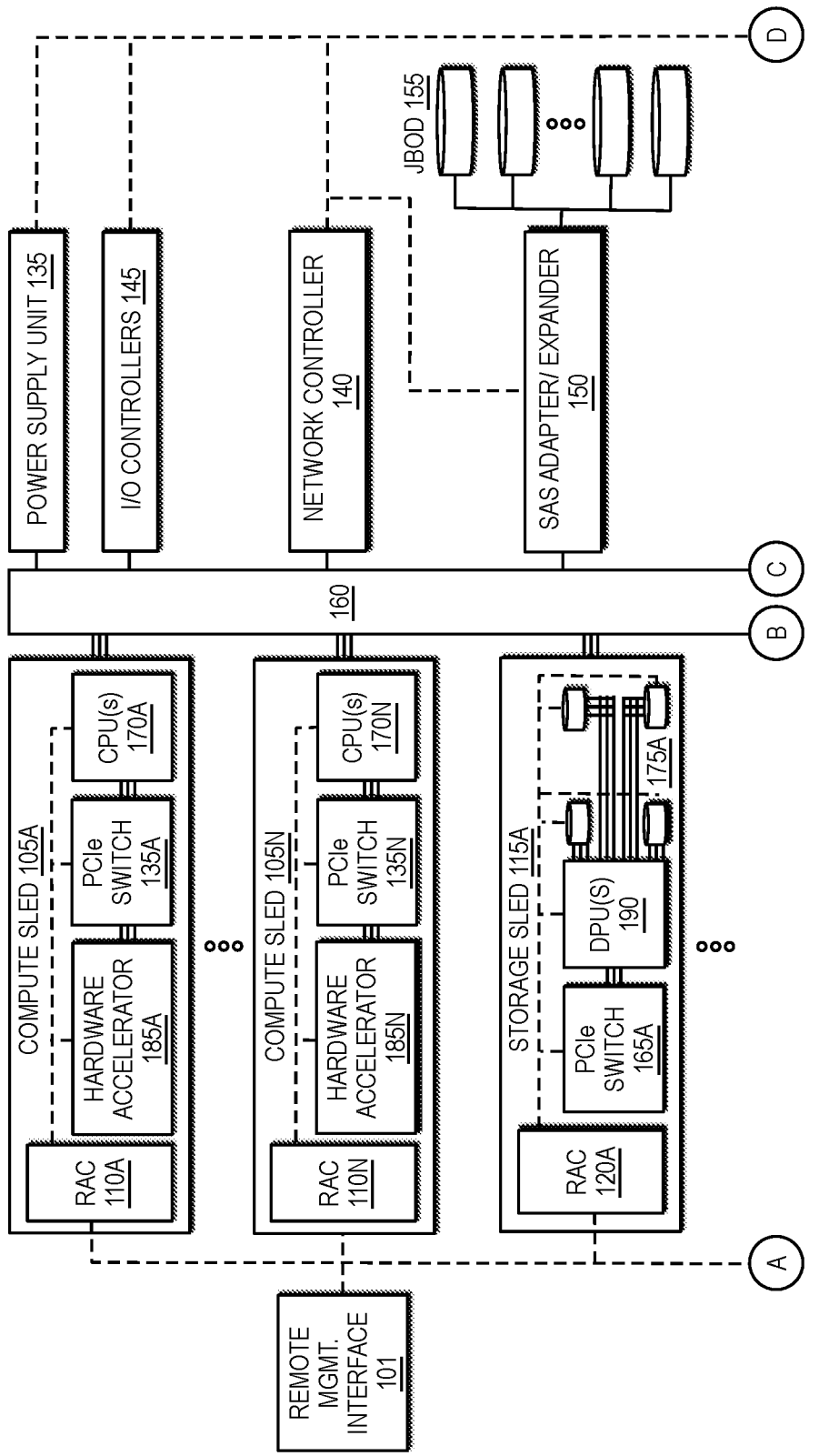
FIG. 1 is a diagram illustrating certain components of a chassis configured, according to some embodiments, for vulnerability proofing deployment of a container orchestration platform.
Figure 1B:
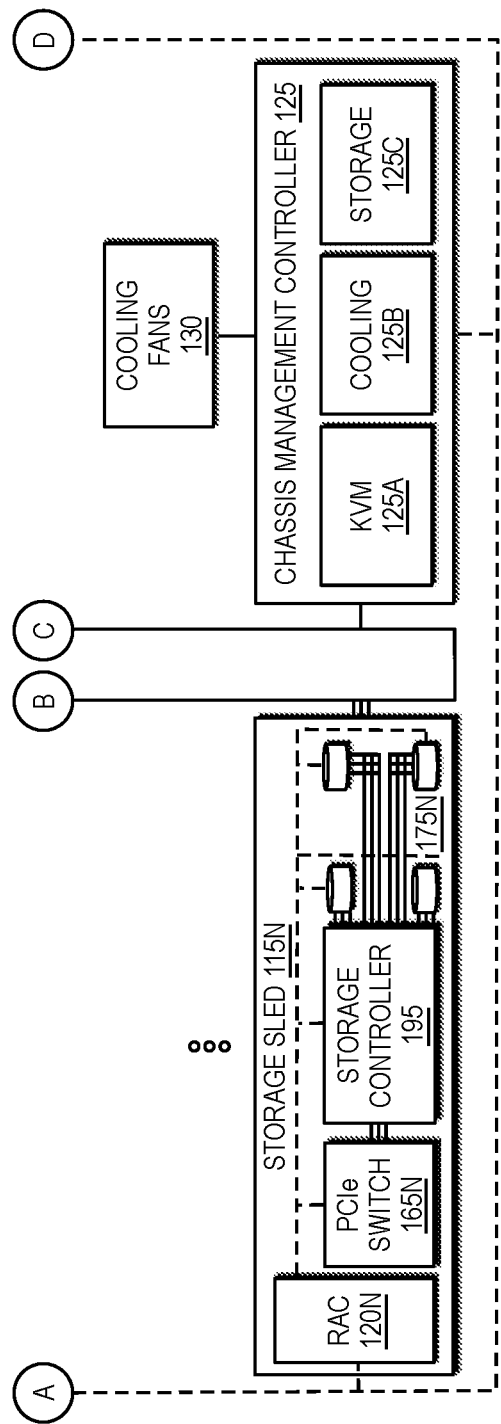

FIG. 1 is a block diagram illustrating certain components of a chassis 100 comprising one or more compute sled IHSs 105a-n and one or more storage sled IHSs 115a-n that may be configured to implement the systems and methods described for vulnerability proofing deployment of a container orchestration platform. 105a-n, 115a-n that are components of the chassis 100. Embodiments of chassis 100 may include a wide variety of hardware configurations in which one or more IHS 105a-n, 115a-n are installed in chassis 100. Such variations in hardware configurations may result from chassis 100 being factory assembled to include components specified by a customer that has contracted for manufacture and delivery of chassis 100.

Upon delivery and deployment of a chassis 100, the chassis 100 may be modified by replacing and/or adding various hardware components, in addition to replacement of the removeable IHSs 105a-n, 115a-n that are installed in the chassis. In addition, once the chassis 100 has been deployed, firmware and other software used by individual hardware components of the IHSs 105a-n, 115a-n, or by other hardware components of chassis 100, may be modified in order to update the operations that are supported by these hardware components. In some instances, such updates may be used to enable and disable features of an IHS and/or chassis that have been licensed for use by an owner or operator of the chassis 100, where the features that have been enabled and conditions for use of the enabled features may be set forth in a service agreement that is associated with the chassis 100.

Traditionally, applications designed to solve problems using information technology ran on physical servers (e.g., 105a-n). As the number of applications required to run on a physical server grew, defining and allocating resource boundaries for applications on a physical server became difficult. To address this, virtualization was introduced. Each virtual machine is a full "machine" running all the components, including its own operating system, on top of the virtualized hardware. As virtual machines are full machines, they are considered "heavyweights." Containers are introduced to provide relaxed isolation, including sharing the operating system among the applications. Containers are considered "lightweight." In a production environment, containers need to be managed to ensure that there is no downtime. A container orchestration platform, such as Kubernetes (K8s), an open-source container orchestration system for automating software deployment, scaling, and management, is a framework to run distributed systems resiliently. The container orchestration platform handles scaling and failover for applications, provides deployment patterns, etc. To provide functionality, the container orchestration platform abstracts physical systems. System administrators install the container orchestration platform on physical servers (e.g., 105a-n) to deploy their applications there. As discussed in greater detail below, system providers find vulnerabilities and provide advice on how to manage, repair, and mitigate them. However, system administrators may be unaware of the known vulnerabilities at the time of installing the container orchestration platform, making their environment vulnerable. Thus, deployment of a container orchestration platform, such as deployment of K8s, may present vulnerability proofing challenges for a system administrator, such as datacenter administrator. Embodiments of the present vulnerability proofing of container orchestration platform deployment safeguard the environment against known vulnerabilities while installing a container orchestration platform Kubernetes.

Deployment of a container orchestration platform to the IHSs 105a-n, 115a-n installed in chassis 100 may be initiated using a container orchestration platform installer. Thusly, rather than installing the container orchestration platform on IHSs 105a-n, 115a-n individually, an administrator may utilize such a container orchestration platform installer that installs the container orchestration platform installer for use in the operation of the hardware and software of an IHS. This same a container orchestration platform installer may be utilized on one or all of the IHSs 105a-n, 115a-n of chassis 100. Moreover, it may be utilized on IHSs 105a-n, 115a-n throughout a datacenter. Accordingly, any vulnerabilities present in a container orchestration platform installer package may be inadvertently spread throughout a datacenter by an administrator. As described in additional detail below, in embodiments, the use of such a container orchestration platform installer may be proofed for any known vulnerabilities, such as by a vulnerability management service integrated into the container orchestration platform installer, thus preventing deployment of a container orchestration platform on an IHS that results in known vulnerabilities.

Chassis 100 may include one or more bays that each receive an individual sled (that may be additionally or alternatively referred to as a tray, blade, and/or node) IHSs, such as compute sleds 105a-n and storage sleds 115a-n. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the compute sleds 105a-n and storage sleds 115a-n, thus providing efficiency improvements and supporting greater computational loads. For instance, certain computational workloads, such as computations used in machine learning and other artificial intelligence systems, may utilize computational and/or storage resources that are shared within an IHS, within an individual chassis 100 and/or within a set of IHSs that may be spread across multiple chassis of a data center.

Implementing computing systems that span multiple processing components of chassis 100 is aided by high-speed data links between these processing components, such as PCIe connections that form one or more distinct PCIe switch fabrics that are implemented by PCIe switches 135a-n, 165a-n installed in the IHSs 105a-n, 115a-n of the chassis. These high-speed data links may be used to support algorithm implementations that span multiple processing, networking and storage components of an IHS and/or chassis 100. For instance, computational workloads may be delegated to a specific processing component of an IHS, such as to a hardware accelerator 185a-n that may include one or more programmable processors that operate separate from the main CPUs 170a-n of computing sleds 105a-n. In various embodiments, such hardware accelerators 185a-n may include DPUs (Data Processing Units), GPUs (Graphics Processing Units), SmartNICs (Smart Network Interface Card) and/or FPGAs (Field Programmable Gate Arrays). These hardware accelerators 185a-n operate according to firmware instructions that may be occasionally updated to adapt the capabilities of the respective hardware accelerators 185a-n to specific computing tasks. In some instances, firmware updates to hardware accelerators 185a-n may serve to adapt the hardware accelerator for a particular computing function, or for a particular operating environment.

Chassis 100 may be installed within a rack structure that provides at least a portion of the cooling utilized by the IHSs 105a-n, 115a-n installed in chassis 100. In supporting airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air away from sleds 105a-n, 115a-n installed within the chassis. In this manner, a rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160 and between different components mounted on the printed circuit board of the backplane 160. In the illustrated embodiment, the connectors for use in coupling sleds 105a-n, 115a-n to backplane 160 include PCIe couplings that support high-speed data links with the sleds 105a-n, 115a-n. In various embodiments, backplane 160 may support various types of connections, such as cables, wires, midplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140, chassis management controller 125 and power supply unit 135.

Figure 2:
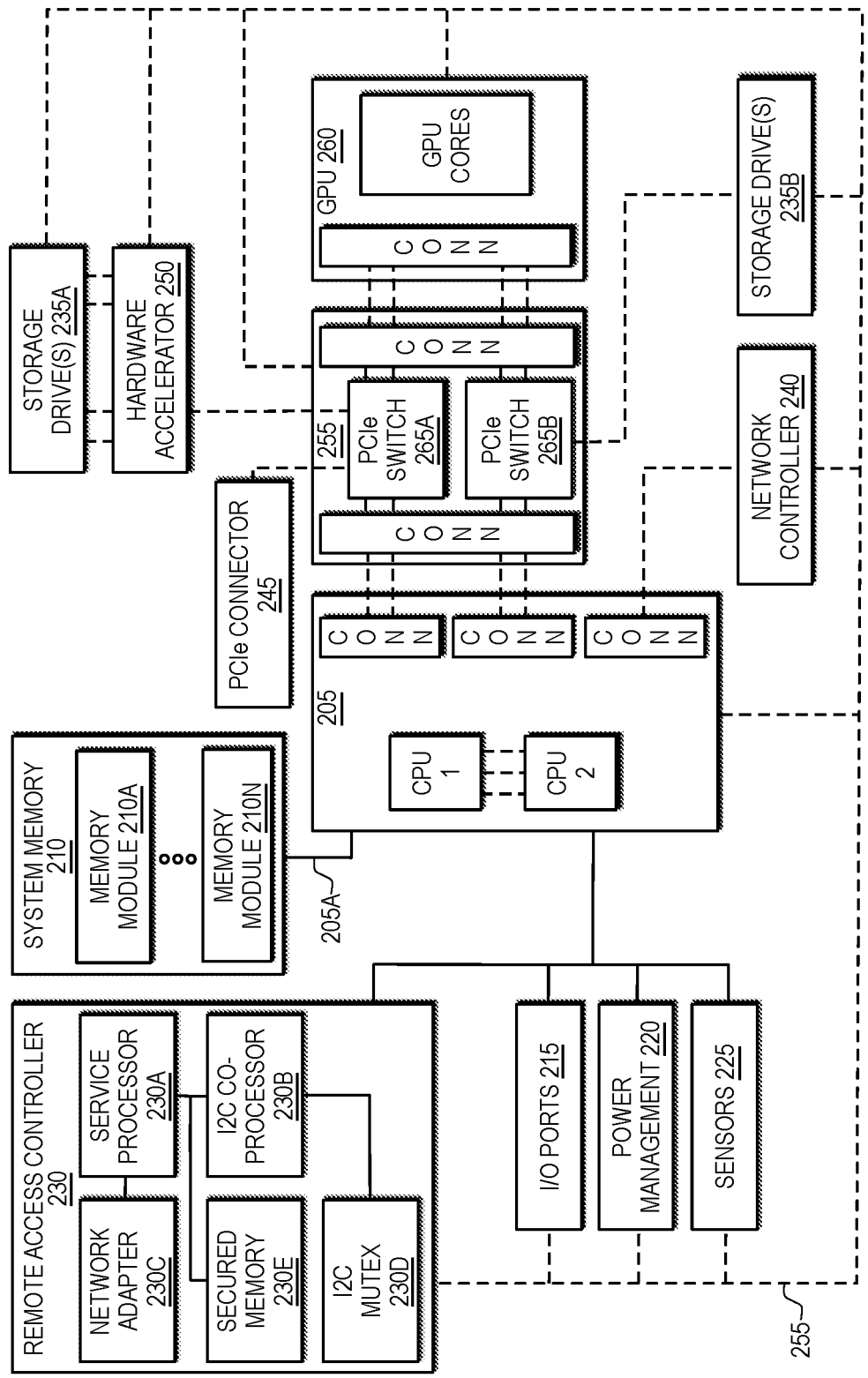
FIG. 2 is a diagram illustrating certain components of an IHS configured, according to some embodiments, for vulnerability proofing deployment of a container orchestration platform.

In certain embodiments, each individual sled 105a-n, 115a-n may be an IHS such as described with regard to IHS 200 of FIG. 2. Sleds 105a-n, 115a-n may individually or collectively provide computational processing resources that may be used to support a variety of e-commerce, multimedia, business and scientific computing workloads, such as artificial intelligence systems provided via cloud computing implementations. Sleds 105a-n, 115a-n are regularly configured with hardware and software that provide leading-edge computational capabilities. Accordingly, services that are provided using such computing capabilities that are provided as high-availability systems that operate with minimum downtime.

As illustrated, each sled 105a-n, 115a-n includes a respective remote access controller (RAC) 110a-n, 120a-n. As described in additional detail with regard to FIG. 2, remote access controller 110a-n, 120a-n provides capabilities for remote monitoring and management of a respective sled 105a-n, 115a-n and/or of chassis 100. In support of these monitoring and management functions, remote access controllers 110a-n may utilize both in-band and side-band (i.e., out-of-band) communications with various managed components of a respective sled 105a-n and chassis 100. Remote access controllers 110a-n, 120a-n may collect various types of sensor data, such as collecting temperature sensor readings that are used in support of airflow cooling of the chassis 100 and the sleds 105a-n, 115a-n. In addition, each remote access controller 110a-n, 120a-n may implement various monitoring and administrative functions related to a respective sleds 105a-n, 115a-n, where these functions may be implemented using sideband bus connections with various internal components of the chassis 100 and of the respective sleds 105a-n, 115a-n. In various embodiments, these capabilities of the remote access controllers 110a-n, 120a-n may be utilized in updating the firmware or other software utilized by hardware components of chassis 100 and/or of hardware components of the sleds 110a-n, 120a-n.

As described in additional detail below, remote access controllers 110a-n, 120a-n may be configured to enforce validation proofing deployment of a container orchestration platform on respective IHS sleds 105a-n, 115a-n that are installed in chassis 100. Deployment of a container orchestration platform on chassis 100 and IHSs 105a-n, 115a-n may be carried out through the use of a container orchestration platform installer that, in accordance with various embodiments herein, integrates a vulnerability management service to be executed by the remote access controllers 110a-n, 120a-n. In embodiments, use of such a container orchestration platform installer integrating a vulnerability management service results in known vulnerabilities being avoided in a deployment of the container orchestration platform.

The remote access controllers 110a-n, 120a-n that are present in chassis 100 may support secure connections with a remote management interface 101. In some embodiments, remote management interface 101 provides a remote administrator with various capabilities for remotely administering the operation of an IHS, including initiating updates to the software and hardware installed in the chassis 100, such as deployment of a container orchestration platform, for example through use of a deployment of a container orchestration platform installer. For example, remote management interface 101 may provide capabilities by which an administrator can initiate updates to the firmware utilized by all of the storage drives 175a-n installed in a chassis 100, or to the firmware utilized by all of the storage drives 175a-n of a particular model or manufacturer. In some instances, remote management interface 101 may include an inventory of the hardware, software and firmware of chassis 100 that is being remotely managed through the operation of the remote access controllers 110a-n, 120a-n. The remote management interface 101 may also include various monitoring interfaces for evaluating telemetry data collected by the remote access controllers 110a-n, 120a-n. In some embodiments, remote management interface 101 may communicate with remote access controllers 110a-n, 120a-n via a protocol such the Redfish remote management interface.

In the illustrated embodiment, chassis 100 includes one or more compute sleds 105a-n that are coupled to the backplane 160 and installed within one or more bays or slots of chassis 100. Each of the individual compute sleds 105a-n may be an IHS, such as described with regard to FIG. 2. Each of the individual compute sleds 105a-n may include various different numbers and types of processors that may be adapted to performing specific computing tasks. In the illustrated embodiment, each of the compute sleds 105a-n includes a PCIe switch 135a-n that provides access to a hardware accelerator 185a-n, such as the described DPUs, GPUs, Smart NICs and FPGAs, that may be programmed and adapted for specific computing workloads, such as to support machine learning or other artificial intelligence systems. As described in additional detail below, compute sleds 105a-n may include a variety of hardware components, such as hardware accelerator 185a-n and PCIe switches 135a-n, that operate using firmware that may be occasionally updated to adapt these programmable components for operation for different computing workloads.

As illustrated, chassis 100 includes one or more storage sleds 115a-n that are coupled to the backplane 160 and installed within one or more bays of chassis 100 in a similar manner to compute sleds 105a-n. Each of the individual storage sleds 115a-n may include various different numbers and types of storage devices. As described in additional detail with regard to FIG. 2, a storage sled 115a-n may be an IHS 200 that includes multiple solid-state drives (SSDs) 175a-n, where the individual storage drives 175a-n may be accessed through a PCIe switch 165a-n of the respective storage sled 115a-n.

As illustrated, a storage sled 115a may include one or more DPUs (Data Processing Units) 190 that provide access to and manage the operations of the storage drives 175a of the storage sled 115a. Use of a DPU 190 in this manner provides low-latency and high-bandwidth access to numerous SSDs 175a. These SSDs 175a may be utilized in parallel through NVMe transmissions that are supported by the PCIe switch 165a that connects the SSDs 175a to the DPU 190. In some instances, PCIe switch 165a may be in integrated component of a DPU 190. The data storage and retrieval capabilities provided by such storage sled 115a implementations may be harnessed by offloading storage operations directed as storage drives 175a to a DPU 190a, and thus without relying on the main CPU of the storage sled, or of any other component of chassis 100. As indicated in FIG. 1, chassis 100 may also include one or more storage sleds 115n that provide access to storage drives 175n via a storage controller 195. In some instances, storage controller 195 may provide support for RAID (Redundant Array of Independent Disks) configurations of logical and physical storage drives, such as storage drives provided by storage sled 115n. In some instances, storage controller 195 may be a HBA (Host Bus Adapter) that provides more limited capabilities in accessing storage drives 175n.

In addition to the data storage capabilities provided by storage sleds 115a-n, chassis 100 may provide access to other storage resources that may be installed components of chassis 100 and/or may be installed elsewhere within a rack that houses the chassis 100. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that, in some instances, may be configured and managed individually and without implementing data redundancy across the various drives 155. The additional storage resources 155 may also be at various other locations within a datacenter in which chassis 100 is installed.

In light of the various manners in which storage drives 175a-n, 155 may be coupled to chassis 100, a wide variety of different storage topologies may be supported. Through these supported topologies, storage drives 175a-n, 155 may be logically organized into clusters or other groupings that may be collectively tasked and managed to support specific computing workloads. In some instances, a chassis 100 may include numerous storage drives 175a-n, 155 that are identical, or nearly identical, such as arrays of SSDs of the same manufacturer and model. Accordingly, any updates, or other administration of storage drives 175a-n, 155, requires the updates to be applied within each of these topologies being supported by the chassis 100. Despite the large number of different storage drive topologies that may be supported by an individual chassis 100, the firmware or other software used by each of these storage devices 175a-n, 155 may be occasionally updated.

As illustrated, the chassis 100 of FIG. 1 includes a network controller 140 that provides network access to the sleds 105a-n, 115a-n installed within the chassis. Network controller 140 may include various switches, adapters, controllers and couplings used to connect chassis 100 to a network, either directly or via additional networking components and connections provided via a rack in which chassis 100 is installed. Network controller 140 operates according to firmware instructions that may be occasionally updated, to enable and disable features supported by the network controller.

Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may provide chassis 100 with redundant, hot-swappable power supply units. Power supply unit 135 may operate according to firmware instructions that may be occasionally updated, to adapt the power supply unit for operation according to different modes of operation.

Chassis 100 may also include various I/O controllers 140 that may support various I/O ports, such as USB ports that may be used to support keyboard and mouse inputs and/or video display capabilities. Each of the I/O controllers 140 may operate according to firmware instructions that may be occasionally updated, such as to adapt the I/O controller 140 for operation with different external systems. Such I/O controllers 145 may be utilized by the chassis management controller 125 to support various KVM (Keyboard, Video and Mouse) 125a capabilities that provide administrators with the ability to interface with the chassis 100. The chassis management controller 125 may also include a storage module 125c that provides capabilities for managing and configuring certain aspects of the storage devices of chassis 100, such as the storage devices provided within storage sleds 115a-n and within the JBOD 155.

In addition to providing support for KVM 125a capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125b of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 illustrates an example of an IHS 200 configured to implement systems and methods described herein for vulnerability proofing deployment of a container orchestration platform on IHS 200. It should be appreciated that although the embodiments described herein may describe an IHS that is a compute sled or similar computing component that may be deployed within the bays of a chassis, a variety of other types of IHSs, such as laptops and portable devices, may also operate according to embodiments described herein. In the illustrative embodiment of FIG. 2, IHS 200 may be a computing component, such as sled 105a-n, 115a-n or other type of server, such as an 1RU server installed within a 2RU chassis, that is configured to share infrastructure resources provided within a chassis 100.

IHS 200 may utilize one or more system processors 205, that may be referred to as CPUs (Central Processing Units). In some embodiments, CPUs 205 may each include a plurality of processing cores that may be separately delegated with computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit that is located on the same die as the CPU 205. Each memory controller may be configured to manage the transfer of data to and from a system memory 210 of the IHS, in some cases using a high-speed memory bus 205a. The system memory 210 is coupled to CPUs 205 via one or more memory buses 205a that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses. IHS 200 may also include one or more I/O ports 215 that may be used to couple the IHS 200 directly to other IHSs, storage resources, diagnostic tools, and/or other peripheral components. A variety of additional components may be coupled to CPUs 205 via a variety of in-line busses. For instance, CPUs 205 may also be coupled to a power management unit 220 that may interface with a power system of the chassis 100 in which IHS 200 may be installed. In addition, CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or other component that is coupled to a connector (e.g., PCIe connector of a motherboard, backplane, midplane, etc.) of IHS 200. In some embodiments, network controller 240 may support high-bandwidth network operations by the IHS 200 through a PCIe interface that is supported by the chipset of CPUs 205. Network controller 240 may operate according to firmware instructions that may be occasionally updated.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity. In some embodiments, each of the PCIe switches 265a-b may be a replaceable expansion card or other component that is coupled to a connector of IHS 200. Each of the PCIe switches 265a-b may operate according to firmware instructions that may be occasionally updated.

As indicated in FIG. 2, IHS 200 may support storage drives 235a-b in various topologies, in the same manner as described with regard to the chassis 100 of FIG. 1. In the illustrated embodiment, storage drives 235a are accessed via a hardware accelerator 250, while storage drives 235b are accessed directly via PCIe switch 265b. In some embodiments, the storage drives 235a-b of IHS 200 may include a combination of both SSD and magnetic disk storage drives. In other embodiments, all of the storage drives 235a-b of IHS 200 may be identical, or nearly identical. In all embodiments, storage drives 235a-b operate according to firmware instructions that may be occasionally updated. In some embodiments, each of the storage drives 235a-b may be replaceable components that are coupled to a connector of IHS 200.

As illustrated, PCIe switch 265a is coupled via a PCIe link to a hardware accelerator 250, such as a DPU, Smart-NIC, GPU and/or FPGA, that may be a connected to the IHS via a removeable card or baseboard that couples to a PCIe connector of the IHS 200. In some embodiments, hardware accelerator 250 includes a programmable processor that can be configured for offloading functions from CPUs 205. In some embodiments, hardware accelerator 250 may include a plurality of programmable processing cores and/or hardware accelerators, that may be used to implement functions used to support devices coupled to the IHS 200. In some embodiments, the processing cores of hardware accelerator 250 include ARM (advanced RISC (reduced instruction set computing) machine) processing cores. In other embodiments, the cores of DPUs 250a-b may include MIPS (microprocessor without interlocked pipeline stages) cores, RISC-V cores, or CISC (complex instruction set computing) (i.e., x86) cores. Each programmable hardware accelerator 250 may operate according to firmware or other instructions that may be occasionally updated.

In the illustrated embodiment, the programmable capabilities of hardware accelerator 250 implements functions used to support replaceable storage drives 235a, such as SSDs. In such storage drive topologies, hardware accelerator 250 may implement processing of PCIe NVMe communications with SSDs 235a, thus supporting high-bandwidth connections with these SSDs. Hardware accelerator 250 may also include one more memory devices used to store program instructions executed by the processing cores and/or used to support the operation of SSDs 235a such as in implementing cache memories and buffers utilized in support high-speed operation of these storage drives, and in some cases may be used to provide high-availability and high-throughput implementations of the read, write and other I/O operations that are supported by these storage drives 235a. In other embodiments, hardware accelerator 250 may implement operations in support of other types of devices and may similarly support high-bandwidth PCIe connections with these devices. For instance, in various supported workloads, hardware accelerator 250 may support high-bandwidth connections, such as PCIe connections, with networking devices in implementing functions of a network switch, compression and codec functions, virtualization operations or cryptographic functions. In some instances, updates to firmware utilized by hardware accelerators 250 may enable and disable features supported by the hardware accelerators 250.

As illustrated in FIG. 2, PCIe switches 265a-b may also support PCIe couplings with one or more GPUs (Graphics Processing Units) 260. Embodiments may include one or more GPU cards, where each GPU card is coupled to one or more of the PCIe switches 265a-b, and where each replaceable GPU card may include one or more GPUs 260. In some embodiments, PCIe switches 265a-b may transfer instructions and data for generating video images by the GPUs 260 to and from CPUs 205. Accordingly, GPUs 260 may include on or more hardware-accelerated processing cores that are optimized for performing streaming calculation of vector data, matrix data and/or other graphics data, thus supporting the rendering of graphics for display on devices coupled either directly or indirectly to IHS 200. In some workloads, GPUs may be utilized as programmable computing resources for offloading other functions from CPUs 205, in the same manner as hardware accelerator 250. Accordingly, GPUs 260 may operate according to firmware instructions that may be occasionally updated.

As illustrated in FIG. 2, PCIe switches 265*a-b* may support PCIe connections in addition to those utilized by GPUs 260 and hardware accelerator 250, where these connections may include PCIe links of one or more lanes. For instance, PCIe connectors 245 supported by a printed circuit board of IHS 200 may allow various other systems and devices to be coupled to the IHS. Through couplings to PCIe connectors 245*a*, a variety of removeable data storage devices, graphics processors and network interface cards may be coupled to IHS 200, thus supporting a wide variety of topologies of devices that may be removably coupled to the IHS 200.

As described, IHS 200 includes a remote access controller 230 that supports remote management of IHS 200 and of various internal components of IHS 200. In certain embodiments, remote access controller 230 may operate from a different power plane from the processors 205 and other components of IHS 200, thus allowing the remote access controller 230 to operate, and management tasks to proceed, while the processing cores of IHS 200 are powered off. Various functions provided by the BIOS, including launching the operating system of the IHS 200, and/or functions of a TPM may be implemented or supplemented by the remote access controller 230. In some embodiments, the remote access controller 230 may perform various functions to verify the integrity of the IHS 200 and its hardware components prior to initialization of the operating system of IHS 200 (i.e., in a bare-metal state). In some embodiments, certain operations of the remote access controller 230, such as the operations described herein for validation proofing deployment of a container orchestration platform on IHS 200, may operate using validated instructions, and thus within the root of trust of IHS 200.

As provided above, remote access controller 230 may be configured to implement validation proofing procedures invoked by a vulnerability management service integrated into a container orchestration platform installer to ensure deployment of the container orchestration platform does not result in known vulnerabilities on IHS 200. Otherwise, in instances where remote access controller 230 identifies such known vulnerabilities, embodiments may halt any further use of the container orchestration platform installer on IHS 200. In this manner, remote access controller 230 may prevent an installation of a container orchestration platform to IHS 200 that would result in known vulnerabilities. For instance, during deployment of a container orchestration platform using such and installer, remote access controller 230 evaluates the proposed configurations for managed hardware components 205, 235*a-b*, 240, 250, 255, 260 of IHS 200 against one or more catalogs of known hardware vulnerabilities that may result from installation of a container orchestration platform, such as specific firmware versions that have been replaced due to security flaws or functional errors. If any vulnerabilities are identified in the firmware to be loaded and used to operate these managed hardware components 205, 235*a-b*, 240, 250, 255, 260, remote access controller 230 may halt further deployment of the container orchestration platform, thus preventing IHS from being deployed within a data center with any hardware components that have been configured with known vulnerabilities.

In some embodiments, remote access controller 230 may include a service processor 230*a*, or specialized microcontroller, that operates management software that supports remote monitoring and administration of IHS 200. The management operations supported by remote access controller 230 may be remotely initiated, updated and monitored via a remote management interface 101, such as described with regard to FIG. 1. Remote access controller 230 may be installed on the motherboard of IHS 200 or may be coupled to IHS 200 via an expansion slot or other connector provided by the motherboard. In some instances, the management functions of the remote access controller 255 may utilize information collected by various managed sensors 225 located within the IHS. For instance, temperature data collected by sensors 225 may be utilized by the remote access controller 230 in support of closed-loop airflow cooling of the IHS 200. As indicated, remote access controller 230 may include a secured memory 230*e* for exclusive use by the remote access controller in support of management operations.

In some embodiments, remote access controller 230 may implement monitoring and management operations using MCTP (Management Component Transport Protocol) messages that may be communicated to managed devices 205, 235*a-b*, 240, 250, 255, 260 via management connections supported by a sideband bus 255. In some instances, the sideband management connections supported by remote access controller 230 may include PLDM (Platform Level Data Model) management communications with the managed devices 205, 235*a-b*, 240, 250, 255, 260 of IHS 200.

In some embodiments, the remote access controller 230 may additionally or alternatively use MCTP messaging to transmit Vendor Defined Messages (VDMs) via the in-line PCIe switch fabric supported by PCIe switches 265*a-b*. For instance, remote access controller 230 may transmit firmware to managed devices utilizing inband signaling, such as VDMs that are transmitted using MCTP over the PCIe switch fabric that is implemented by PCIe switch 255, and/or utilizing sideband signaling, such as PLDM communications transmitted via sideband connections 255 supported by an I2C co-processor 230*b* of the remote access controller 230.

As illustrated, remote access controller 230 may include a network adapter 230*c* that provides the remote access controller with network access that is separate from the network controller 240 utilized by other hardware components of the IHS 200. Through secure connections supported by network adapter 230*c*, remote access controller 230 communicates management information with remote management interface 101. In support of remote monitoring functions, network adapter 230*c* may support connections between remote access controller 255 and external management tools using wired and/or wireless network connections that operate using a variety of network technologies. As a non-limiting example of a remote access controller, the integrated Dell Remote Access Controller (iDRAC) from Dell® is embedded within Dell servers and provides functionality that helps information technology (IT) administrators deploy, update, monitor, and maintain servers remotely.

Remote access controller 230 supports monitoring and administration of the managed devices of an IHS via a sideband bus interface 255. For instance, messages utilized in device and/or system management may be transmitted using I2C sideband bus 255 connections that may be individually established with each of the respective managed devices 205, 235*a-b*, 240, 250, 255, 260 of the IHS 200 through the operation of an I2C multiplexer 230*d* of the remote access controller. As illustrated in FIG. 2, the managed devices 205, 235*a-b*, 240, 250, 255, 260 of IHS 200 are coupled to the CPUs 205, either directly or directly, via in-line buses that are separate from the I2C sideband bus 255 connections used by the remote access controller 230 for device management.

In certain embodiments, the service processor 230*a* of remote access controller 230 may rely on an I2C co-processor 230*b* to implement sideband I2C communications between the remote access controller 230 and the managed hardware components 205, 235*a-b*, 240, 250, 255, 260 of the IHS 200. The I2C co-processor 230*b* may be a specialized co-processor or micro-controller that is configured to implement a I2C bus interface used to support communications with managed hardware components 205, 235*a-b*, 240, 250, 255, 260 of IHS. In some embodiments, the I2C co-processor 230*b* may be an integrated circuit on the same die as the service processor 230*a*, such as a peripheral system-on-chip feature that may be provided by the service processor 230*a*. The sideband I2C bus 255 is illustrated as single line in FIG. 2. However, sideband bus 255 may be comprises of multiple signaling pathways, where each may be comprised of a clock line and data line that couple the remote access controller 230 to I2C endpoints 205, 235*a-b*, 240, 250, 255, 260.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
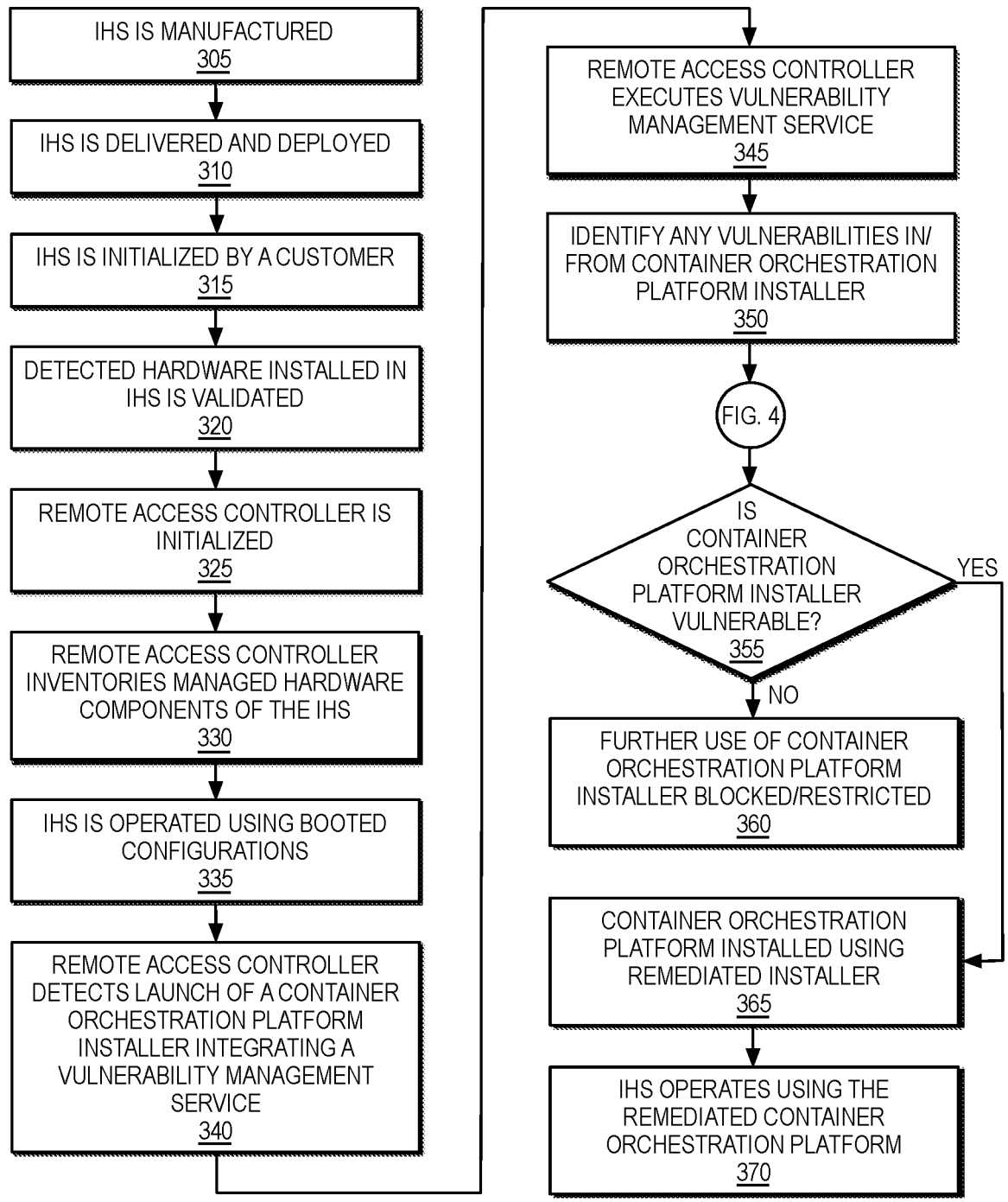
FIG. 3 is a flow chart diagram illustrating certain steps of methods, according to some embodiments, for vulnerability proofing deployment of a container orchestration platform.

FIG. 3 is a flow chart diagram illustrating certain steps 300 of methods, according to some embodiments, for vulnerability proofing deployment of a container orchestration platform, such as the IHSs described with regard to FIGS. 1 and 2. Some embodiments of the method of FIG. 3 may begin, at block 305, with the factory assembly and provisioning of an IHS, such as a server IHS described with regard to FIGS. 1 and 2, where the IHS is factory provisioned to implement procedures that implement validation proofing procedures for deployment of a container orchestration platform, thus ensuring that vulnerabilities are not introduced when intending to deploy the container orchestration platform on an IHS.

In some instances, an IHS may be manufactured using a factory process that includes multiple phases of assembly, validation and provisioning that must be completed before the IHS is shipped to a customer. As described, an IHS such as a server may be purpose-built for a particular customer such that the server is assembled and provisioned according to specifications provided by the customer. The initial factory assembly of such server IHSs may include the selection of a chassis and the fastening of various hardware components to the selected chassis. Such a factory assembly process may include generating a manifest that tracks the individual hardware components that are installed in an IHS. As described above, the installed hardware components may include standard components and may also include specialized components that have been requested by a specific customer that has contracted for the assembly and delivery of an IHS. For example, a customer request an IHS with a specific set of hardware components installed, where each of the hardware components in the requested configuration operates using a specific firmware version.

Once the assembly of an IHS has been completed, the IHS may be subjected to manual and automated inspections that confirm the IHS has been properly assembled and does not include any defects. After confirming an IHS has been assembled without any manufacturing defects, factory provisioning of the IHS may be initiated. In some instances, the provisioning of an IHS at the factory may include various stages that may include stages for loading of firmware, configuring hardware components, and installing an operating system and other software. Various different aspects of this factory provisioning process may be conducted using a factory provisioning application, where this factory provisioning application may run on one or more servers and may interface with an IHS that is being provisioned once a requisite amount of firmware and software has been installed to the IHS.

A manifest of the individual hardware components that are installed in an IHS may be generated during assembly of the IHS. Such a manifest may be a file that includes an entry for each component installed to an IHS, where the entry may specify various characteristics of the component, such as model numbers and installation locations, and may also specify any unique identifiers associated with the component, such as a MAC address or a serial number. The manifest generated during assembly of an IHS is provided to the factory provisioning application that will being used to provision the assembled IHS, which includes installing firmware and other software on the IHS.

As part of this factory provisioning, one or more firmware versions and associated firmware settings may be loaded for use by various hardware components of the IHS. In some embodiments, the one or more firmware versions that are loaded for use by each hardware component during factory provisioning may be determined based on a service agreement or other configuration for the IHS that was selected by a customer as part of the purchase of the IHS. Once the set of firmware versions for each of the hardware components of the IHS has been selected, the factory provisioning application may confirm the authenticity and integrity of the selected firmware versions based on digital signatures provided by hardware component manufacturers or other entities providing the firmware. The manifest of the IHS may then be updated to identify the firmware versions that are supported by each of the managed hardware components of IHS and may also be updated to include digital signatures associated with each of the supported firmware versions. In this manner, the factory-provisioning system may upload one or more supported firmware versions to at least some of the factory-installed hardware components of an IHS.

Based on the hardware inventory and firmware version information that is specified in the manifest of the IHS, the factory provisioning application may initiate the generation of an identity certificate that may be used to validate the detected hardware components of the IHS as the same hardware components that were installed during the factory assembly of the IHS. In addition, in some embodiments, an identity certificate may be further factory provisioned to also include vulnerability proofing instructions for use when installing software such as deployment of a container orchestration platform on the IHS. Once the IHS has been delivered, the inventory certificate may then be used to validate the authenticity of the detected hardware and software of an IHS, and to further validate the vulnerability proofing instructions in the inventory certificate, which may then be used in confidence to ensure that deployment of a container orchestration platform does not result in known vulnerabilities.

As described with regard to FIGS. 1 and 2, an IHS may include a remote access controller that provides capabilities for remote management of an IHS, where these remote management capabilities may include sideband management of various managed hardware components of an IHS. In some embodiments, the generation of an inventory certificate, including vulnerability proofing instructions for a newly assembled IHS may be initiated via a request from the factory provisioning application to the remote access controller of the IHS. As described with regard to FIG. 2, a remote access controller of an IHS may include cryptographic capabilities that operate within the root of trust of the IHS and that may include the ability to generate cryptographic keypairs. Utilizing such cryptographic capabilities, the remote access controller initiates the creation of an inventory certificate by generating a cryptographic key pair for use in validating the authenticity of inventory information and for authenticating the vulnerability proofing instructions included in the inventory certificate.

In some embodiments, the remote access controller generates a certificate signing request (CSR) for the generation of a digital identity certificate, where the request specifies the public key of the key pair generated by the remote access controller, and also specifies the factory installed hardware inventory from the manifest that was generated during assembly of the IHS, and also specifies an inventory of the authorized firmware for one or more of the managed hardware components of the IHS, and also specifies vulnerability proofing instructions, such as for deployment of a container orchestration platform. The factory installed and provisioned hardware and firmware inventory information and vulnerability proofing instructions that are included in the CSRs may be signed by the remote access controller using the private key from the generated keypair. The CSR for the requested identity certificate may then be transmitted to the factory provisioning application.

The factory provisioning application may submit the CSR for signing by a factory certificate authority. Upon receipt of the CSR, the factory certificate authority may parse from the CSR: the hardware inventory information, the inventory of authorized firmware for the managed hardware components of the IHS, the vulnerability proofing instructions for the IHS, the public key generated by the remote access controller and the information specifying a requested signing key. Based on the information parsed from the CSRs, the factory certificate authority generates a digital identity certificate, referred to herein as an inventory certificate, that is associated with the public key provided by the remote access controller and that specifies the factory installed hardware inventory of the IHS and vulnerability proofing instructions for the IHS.

The factory certificate authority may submit the generated inventory certificate for signing by a hardware security module that may be a dedicated hardware component of a factory provisioning server that safeguards cryptographic keys and implements cryptographic functions utilized in the factory provisioning process. The hardware security module digitally signs the submitted inventory certificate, which is then returned to the factory provisioning application. In some embodiments, the factory provisioning application may retain a copy of the signed certificate. In some instances, copies of the inventory and device certificate may be retained to reference data store utilized in providing ongoing support of the IHS once it has been shipped and has been deployed by a customer, such as in issuing updated certificates for an IHS in response to changes to the IHS that result in changes to the authorized hardware and/or software supported by the IHS, and in response to changes in vulnerability proofing requirements for deployment of a container orchestration platform.

The signed inventory certificate may then be loaded to the assembled IHS as part of the factory provisioning of the IHS. In some embodiments, the signed inventory certificate may be uploaded to a secured memory of the remote access controller, such as described with regard to FIG. 2. With the generation and transfer of the signed identity certificate completed, additional factory provisioning of the assembled IHS may be completed and, at 310, the assembled IHS is shipped from the factory to a customer. The IHS may be received at a data center and may be further provisioned for deployment within the data center.

Once a received IHS has been provisioned for operation within a datacenter, at 315, the IHS is initialized. As part of the initialization of the IHS, various procedures may be implemented for validating the authenticity of the hardware components of the IHS. As described, an IHS may be factory provisioned to include an inventory certificate that specifies the factory installed hardware components of the IHS. At 320, such a factory-provisioned inventory certificate may be utilized to validate the hardware components detected during initialization of the IHS. Each detected hardware component is identified by the IHS, and the hardware component may be initialized only if its detected identity matches a hardware identity specified in the factory provisioned inventory certificate. In this same manner, the factory-provisioned firmware for these hardware components may also be validated against one or more firmware identities specified in the inventory certificate.

One of the hardware components that may be validated in this manner is a remote access controller of an IHS, where both the identity of the remote access controller and the firmware instructions loaded for use by the remote access controller may be validated based on the signed inventory certificate. At 325, these validated instructions may be used in initializing the remote access controller. Once initialized, at 330, the remote access controller collects an inventory of the detected managed hardware components of the IHS. As described with regard to FIG. 2, a remote access controller may utilize various inband and sideband buses in providing remote management of an IHS and of certain individual hardware components of the IHS. Utilizing these capabilities, the initialized remote access controller may detect each of the managed hardware components that have been successfully validated and initialized.

As a known provisioning profile is used repeatedly for provisioning a newly received IHS, some provisioning profiles are relied upon as "golden" configurations that have been used successfully and are thus trusted by the administrator. However, such reliance on use of existing provisioning profiles may result in the IHS being provisioned with known vulnerabilities. As described in additional detail below, various entities may publish information identifying discovered vulnerabilities of an IHS, specific hardware components and/or specific hardware and software configurations.

Once the remote access controller and other hardware of the IHS have been validated as authentic and operating using authentic instructions, at 335, the IHS is fully initialized, such as booting of an operating system and other user applications. Once in operation, the IHS may operate for any period of time before requiring any updates, but an IHS will inevitably require updates. As described, an IHS may be updated in order to correct errors or other undesirable behavior. IHS updates may improve performance or functionality that may be offered using the software and hardware of the IHS. In some instances, IHS updates may be made in order to configure the IHS for a particular purpose. For instance, a set of IHS updates may be used to configure a hardware accelerator and a set of storage drives as a high-performance data storage cluster, such as for use in particular types of machine learning systems. Additionally, or alternatively, in accordance with embodiments of the present vulnerability proofing container orchestration platform deployment, a container orchestration platform installer may be run on the IHS to deploy the container orchestration platform, thereon.

As noted, embodiments of the present vulnerability proofing for container orchestration platform deployment integrate a vulnerability management service into a container orchestration platform (e.g., k8s) installer. As detailed below, this vulnerability management service retrieves (the) vulnerability information catalog(s) and provide(s) it/them to the container orchestration platform installer with details about vulnerabilities and remedial activities for the supported systems. As also further detailed below, while installing the container orchestration platform, the container orchestration platform installer makes use of the vulnerability management service to determine whether the physical server(s) on which the container orchestration platform is being installed is vulnerable or not. If the physical server(s) on which the container orchestration platform is being installed is vulnerable, the installer initiates remedial actions on the physical server(s) with the help of the vulnerability management service. The container orchestration platform installation is then carried out after successful remediation.

To such ends, the remote access controller, at 340, detects launch of an embodiment of the present container orchestration platform installer on an IHS. As noted, the present container orchestration platform installer includes an integrated vulnerability management service. If an existing container orchestration platform installer, an administrator may be unaware that configurations included in the existing container orchestration platform installer may have known vulnerabilities. For example, an existing container orchestration platform installer may include configuration of use of a particular firmware version by a network controller installed in the IHS, but an administrator may be unaware that a security vulnerability has been identified in this particular firmware version, when used with a (particular) container orchestration platform. Unless the administrator actively investigates whether any vulnerabilities have been identified in the configurations of an existing container orchestration platform installer that is being used to deploy the container orchestration platform, and unless the administrator addresses any identified vulnerabilities, the intended deployment of the container orchestration platform on the IHS will be compromised at the outset with known vulnerabilities. Accordingly, at 345, embodiments may continue with the remote access controller executing the vulnerability management service integrated into the container orchestration platform installer, for determining, at 350, vulnerability proofing requirements for use of container orchestration platform on the IHS.

As described above, in some embodiments, vulnerability proofing instructions for an IHS may be specified within a factory provisioned inventory certificate. For instance, a factory provisioned inventory certificate of an IHS may specify that the IHS may not include any known vulnerabilities. In some instances, an inventory certificate may specify that certain types of hardware components, such as all storage drives, must be configured with no known vulnerabilities, in order to mitigate the risk of simultaneously compromising all of the storage resources of an IHS. In some instances, an inventory certificate may specify that certain types of software installations, such as deployment of a container orchestration platform, must not include any known vulnerabilities. For example, such as a requirement that all hardware accelerators of an IHS must be updated with no known security vulnerabilities, in light of the use of the hardware accelerators in implementing a cryptographic security protocol used to secure communications by the IHS. In such instances, a container orchestration platform installer whose execution results in a known vulnerability for the hardware accelerator may be rejected regardless of the vulnerability status of the other contents of the container orchestration platform installer. In a similar manner, the vulnerability proofing instructions included in an inventory certificate may specify that an IHS may not include known security vulnerabilities, but use of a container orchestration platform installer may proceed with identified functional vulnerabilities, such as known software bugs that are not exploitable as security loopholes, such as a bug that results in a graphics controller using non-calibrated display settings that distort color outputs of a display monitor, or the like.

In some embodiments, the inventory certificate may also specify one or more catalogs of known vulnerabilities that are to be consulted when installing certain types of software, such as deployment of a container orchestration platform. In some embodiments, the inventory certificate may specify types of vulnerabilities that are to be evaluated when deploying software, such as a container orchestration platform, or the like, and responses to the different types of vulnerabilities. In this manner, a customer that manages a large number of IHSs may specify requirements for vulnerability proofing each of the managed IHSs using catalogs of known vulnerabilities that are controlled by the customer and that are securely stored by the individual IHSs. Updating the catalogs that are evaluated for vulnerability proofing the IHSs cannot be circumvented without a factory provisioned update to the inventory certificate that specifies the catalogs that must be investigated for known vulnerabilities. In this manner, datacenter administrators tasked with maintaining support for the IHSs are able to reuse embodiments of the present container orchestration platform installer integrating a vulnerability management service, while being assured the use of the present container orchestration platform installer does not inadvertently configure the IHS with a known vulnerability and thus does not inadvertently introduce vulnerabilities that could impact the entire datacenter.

Once the vulnerability proofing requirements for deployment of a container orchestration platform on the IHS have been identified at 345, the remote access controller executing the vulnerability management service integrated into the container orchestration platform installer, at 350, determines whether deployment of the container orchestration platform on the IHS will result in any known vulnerabilities.

Figure 4:
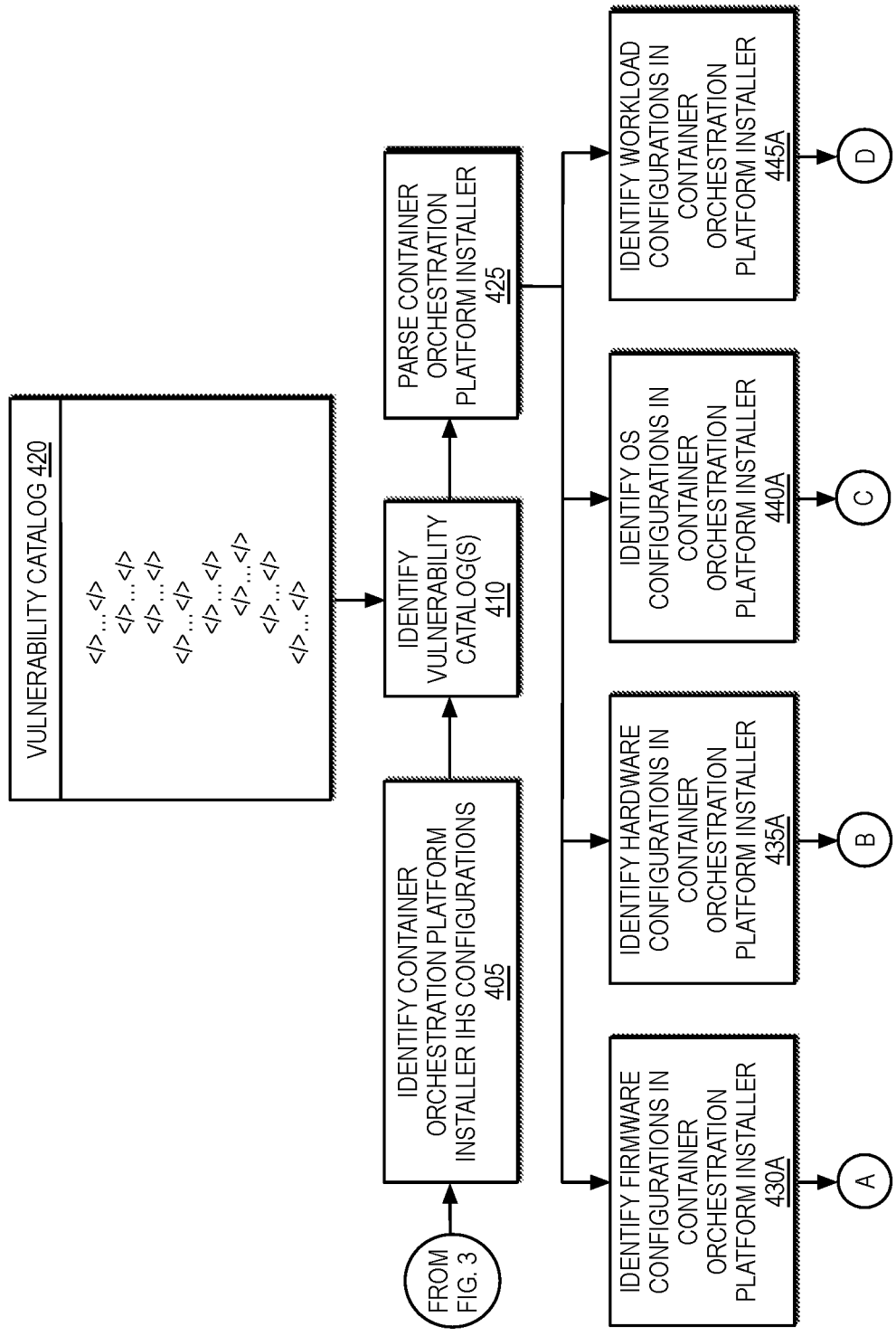
FIG. 4 is a flow chart diagram illustrating certain additional steps of methods, according to some embodiments, for vulnerability proofing deployment of a container orchestration platform.
Figure 4:
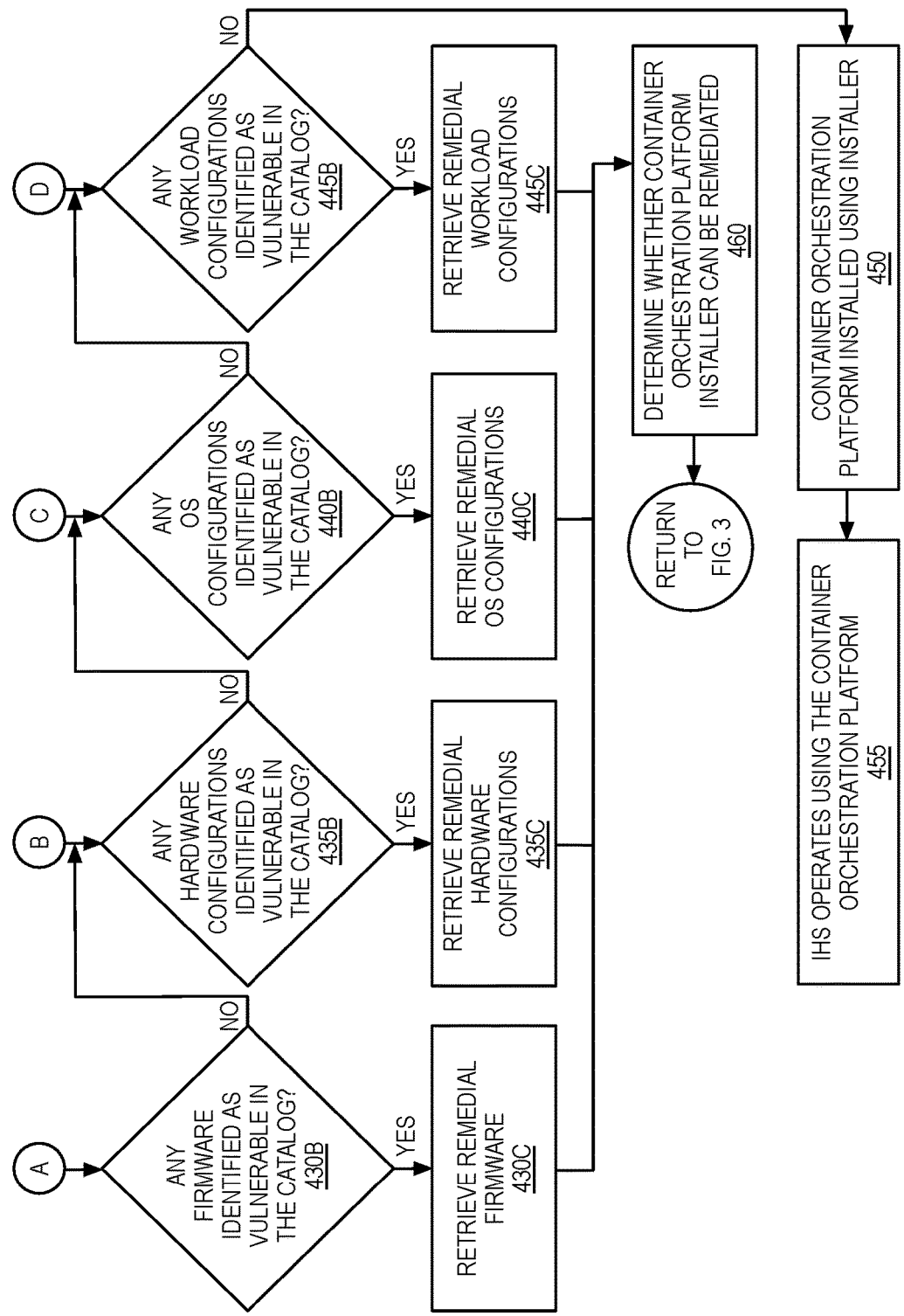

To wit, FIG. 4 is a flow chart diagram illustrating certain additional steps 400 of methods, according to some embodiments, for further vulnerability proofing of deployment of a container orchestration platform. Embodiments of FIG. 4 may begin, at 405, with the identification of container orchestration platform installer IHS configurations. Once use of a container orchestration platform installer has been detected by the remote access controller, some embodiments may halt all further operations by the IHS until vulnerability proofing of the container orchestration platform deployment can be completed.

At 410, the remote access controller executing the vulnerability management service integrated into the container orchestration platform installer identifies one or move catalogs 420 of known vulnerabilities, that may include hardware, software and/or workload configurations with known vulnerabilities. A catalog may be any collection of structured data, such as a database, data structure or a file, such as an XML file. A catalog is intended to be generally available to the public and is intended as available to data center administrators. One or more different entities may generate and maintain catalogs 420 specifying known vulnerabilities of hardware and/or software components that may be installed in an IHS. For instance, the manufacturer of an IHS may maintain one or more catalogs specifying known vulnerabilities identified in IHS models sold by the manufacturer, known vulnerabilities of factory installed hardware components of IHSs sold by the manufacturer, known vulnerabilities in hardware and/or software configurations supported by these hardware components and known vulnerabilities in workload configurations supported by IHSs sold by the manufacturer. Similar catalogs 420 of known vulnerabilities may be maintained by other entities, such as third parties that publish known security vulnerabilities that have been identified in products sold by various different manufacturers. In some instances, catalogs 420 of known vulnerabilities may be maintained by entities contracted to provide technical support for an IHS or for a network of IHSs, such as for one or more data centers. In some instances, catalogs 420 of known vulnerabilities may be maintained by hardware component manufacturers, such as a manufacturer of network controllers that maintains a catalog of vulnerabilities that have been identified in its supported products.

As described, an IHS may be factory provisioned with an inventory certificate that specifies vulnerability proofing instructions for deployment of a container orchestration platform. In some embodiments, the vulnerability proofing instructions may also specify the catalogs for use in identifying known vulnerabilities in installing software, such as deployment of a container orchestration platform, or the like, where the validity of this catalog information included in the inventory certificate can be confirmed based on the digital signatures included in the inventory certificate. In some embodiments, the catalogs that are used in identifying known vulnerabilities in installing software, such as deployment of a container orchestration platform, or the like, may be supplemented through the generation of an updated inventory certificate that adds to the catalogs that must be searched for vulnerabilities by the vulnerability proofing procedures implemented by the remote access controller. In this manner, the inventory certificate may be used to configure vulnerability proofing on an individual IHS, such that the IHS is provided with the best known sources of vulnerability information for use in administration of the IHS.

Despite the existence of such vulnerability catalogs, their use is not enforced within existing procedures for deployment of a container orchestration platform, thus permitting the described opportunity for a container orchestration platform to be deployed on an IHS, resulting in known vulnerabilities. Even if consulting such catalogs of known vulnerabilities is technically a required step in deploying a container orchestration platform, or other software, on an IHS, such requirements cannot be enforced. Moreover, even when an administrator attempts to consult the vulnerability catalogs, the highly tedious task of determining whether any of the hardware or software configurations of a container orchestration platform deployment are present in any of the available vulnerability catalogs is an error-prone task. Additionally, such vulnerability catalogs may be updated at any time, thus requiring an administrator to repeat a complete search for vulnerabilities for each and every use of an existing container orchestration platform installer. Despite the difficulty of enforcing the use of these vulnerability catalogs, such catalogs are still an effective way of disseminating information specifying known hardware and software vulnerabilities to a wide array of customers.

Embodiments may continue, at 425, with the parsing of the hardware and software configurations included in the present container orchestration platform installer. As illustrated in FIG. 4, the configuration information parsed from the present container orchestration platform installer may be evaluated against the known vulnerabilities specified in the vulnerability catalogs. In parsing the present container orchestration platform installer, the remote access controller executing the vulnerability management service integrated into the container orchestration platform installer, at 430*a*, identifies versions of firmware to be installed by the present container orchestration platform installer. For instance, installation of the container orchestration platform may include installing firmware for use in reprogramming an FPGA of the IHS for use in specific machine learning computations, such as in implementing and training neural networks. At 430*b*, the remote access controller executing the vulnerability management service integrated into the container orchestration platform installer determines whether this particular version of firmware (e.g., included for use by the FPGA) in the present container orchestration platform installer has been associated with any known vulnerabilities that are specified in any of the one or more catalogs that are being consulted as part of the vulnerability proofing of the IHS. If no vulnerabilities are identified, updating of the (FPGA) firmware using the present container orchestration platform installer is authorized. However, as indicated in FIG. 4, if any vulnerabilities are identified, the remote access controller executing the vulnerability management service integrated into the container orchestration platform installer, at 430*c*, identifies any available remediation procedures, such as using a different version of the firmware that can be used (e.g., for similarly programming the FPGA to support the machine learning computations). In some instances, the remediation procedures available for addressing known vulnerabilities may themselves also be specified within the vulnerability catalogs. For instance, the vulnerability catalog entry that specifies the vulnerability in the selected (FPGA) firmware may specify an upgraded version of the firmware that patches a discovered security vulnerability, or may specify a downgraded version of the firmware that functions adequately and avoids a security vulnerability in the most recent version of the firmware.

In some embodiments, vulnerability proofing requirements, that may be included in a factory provisioned inventory certificate may specify requirements for validation of updates that utilize programmable capabilities of a hardware component, such as an FPGA. In such embodiments, the vulnerability proofing requirements may specify a catalog that includes a validation engine for evaluating instructions to be used in reprogramming hardware capabilities of an IHS. Upon detecting a firmware update or that reprograms capabilities of a hardware component, such as an FPGA or hardware accelerator, the catalogs that are consulted for vulnerabilities include a catalog that supports an API by which instructions for reprogramming hardware components are submitted for evaluation of vulnerabilities and/or malicious instructions. If any vulnerabilities are found through use of the API supported by this particular catalog, such updates may be treated as vulnerabilities that can potentially be remediated, but otherwise may be rejected the same as other updates that cannot be sufficiently remediated according to the vulnerability proofing requirements of the IHS.

Also in parsing the container orchestration platform installer, the remote access controller executing the vulnerability management service integrated into the container orchestration platform installer, at 435a, identifies any hardware configurations included in the container orchestration platform installer. For instance, updates for a storage controller of an IHS may include configuring the storage controller for operation within a specific storage cluster that is operating within a data center, such as configuration of the storage controller as a part of cluster of servers that implement a RAID storage system. At 435b, the remote access controller executing the vulnerability management service integrated into the container orchestration platform installer determines whether this (RAID) configuration when used (by this particular storage controller) has been associated with any known vulnerabilities that are specified in any of the one or more catalogs that are being consulted as part of the vulnerability proofing. If no vulnerabilities are identified, use of the hardware configurations in the container orchestration platform installer are authorized. However, as indicated in FIG. 4, if any vulnerabilities are identified, the remote access controller executing the vulnerability management service integrated into the container orchestration platform installer, at 435c, identifies any available remediation procedures, such as using an alternate hardware configuration, where the available remediation procedures may also be specified within the vulnerability catalogs. For instance, the vulnerability catalog entry that specifies a vulnerability in use of level 1 RAID configuration with a particular type of storage controller may specify an alternative use of level 2 RAID configurations that avoid a discovered error in level 1 configurations.

Also in parsing the container orchestration platform installer, the remote access controller executing the vulnerability management service integrated into the container orchestration platform installer, at 440a, identifies any operating system configurations included in the container orchestration platform installer. Accordingly, the container orchestration platform installer may include a configuration that upgrades the operating system of the IHS to a new version. At 440b, the remote access controller executing the vulnerability management service integrated into the container orchestration platform installer determines whether this operating system configurations have been associated with any known vulnerabilities that are specified in any of the one or more catalogs that are being consulted as part of the vulnerability proofing. If no vulnerabilities are identified, use of the operating system configurations in the container orchestration platform installer are authorized. However, as indicated in FIG. 4, if any vulnerabilities are identified at 440b, the remote access controller executing the vulnerability management service integrated into the container orchestration platform installer, at 440c, identifies any available remediation procedures, such as using a still newer upgraded operating system version that addresses issues in the version specified in the profile, where the available remediation procedures may also be specified within the vulnerability catalogs.

Also in parsing the container orchestration platform installer, the remote access controller executing the vulnerability management service integrated into the container orchestration platform installer, at 445a, identifies any workload configurations included in the container orchestration platform installer. For instance, the container orchestration platform installer may include configurations for use of a hardware accelerator for machine learning workloads, such as training neural networks used in machine vision. At 445b, the remote access controller executing the vulnerability management service integrated into the container orchestration platform installer determines whether any of the configurations that are part of this workload configuration included in the container orchestration platform installer have been associated with any known vulnerabilities that are specified in any of the one or more catalogs that are being consulted as part of the vulnerability proofing. If no vulnerabilities are identified, configuration of the workload included in the container orchestration platform installer are authorized. However, as indicated in FIG. 4, if any vulnerabilities are identified, at 445b, the remote access controller executing the vulnerability management service integrated into the container orchestration platform installer, at 445d identifies any available remediation procedures, such as a different machine learning configuration that utilizes different hardware accelerator settings, where the available remediation procedures may also be specified within the vulnerability catalogs.

As indicated in FIG. 4, if no vulnerabilities are identified at 430b, 435b, 440b and 445b, inclusively, the configurations included in the container orchestration platform installer are authorized, and at 450, installation of the container orchestration platform continues, using the container orchestration platform installer. The IHS is then deployed and put back into service within the data center, now utilizing the container orchestration platform and the hardware and software configurations from the container orchestration platform installer, at 455.

However, as also indicated in FIG. 4, if any vulnerabilities are identified at any of 430b, 435b, 440b and 445b, embodiments may, at 460 confirm that the container orchestration platform installer can be remediated using the remediation procedures specified in the vulnerability catalogs. The remote access controller executing the vulnerability management service integrated into the container orchestration platform installer determines whether any restrictions may prevent adaptation of the container orchestration platform using the identified remediation procedures. In some instances, applicable service agreements may preclude use of a particular remediation procedure. For example, an applicable service agreement for the IHS may authorize use of only certain RAID configuration levels, even though a storage controller may support a wider range of RAID configurations. In such a scenario, embodiments may determine that remediation procedures that include use of a non-authorized RAID configuration are not available for use on the IHS. In another example, embodiments may determine that a remediation procedure specifying an upgrade to firmware used by a PCIe switch would render the PCIe switch as non-compatible with the GPU that is coupled to the PCIe switch, but does not yet support this upgraded firmware of the PCIe switch.

As indicated, returning to 355 of FIG. 3, embodiments may determine whether the configurations included in the container orchestration platform installer include, or result in, vulnerabilities that cannot be remediated, thus rendering the container orchestration platform installer, and potentially the IHS, as vulnerable. In instances where the identified remediation procedures can be utilized to address identified vulnerabilities, the container orchestration platform installer is amended based on the remediation procedures, and the installation of a container orchestration platform continues, at 365, using the remediated container orchestration platform installer. In some embodiments, remediation procedures that will be used to amend the container orchestration platform installer may be specified to the administrator that has requested use of the container orchestration platform installer, such as via a graphical interface of the remote management interface being used by the administrator. In some embodiments, the administrator may be notified of the identified vulnerabilities in the container orchestration platform installer and may be further notified of the remediation procedures that have been identified and confirmed as available for use by the IHS. In some embodiments, the administrator may be asked to confirm the amendments to the container orchestration platform installer.

Once the remediated container orchestration platform has been deployed at 365, the IHS is deployed and put back into service within the data center, now utilizing the container orchestration platform and the hardware and software configurations from the remediated container orchestration platform installer at 370. By preemptively addressing known vulnerabilities in the container orchestration platform installer, once the container orchestration platform is deployed on the IHS using the remediated container orchestration platform installer, the IHS it is ready for immediate use. In existing systems, a container orchestration platform may be deployed without addressing known vulnerabilities, and once the container orchestration platform is deployed, various tools may be used to identify and address these vulnerabilities. However, if the container orchestration platform is deployed on the IHS with known vulnerabilities, opportunities are provided for these vulnerabilities to be exploited before they are actually addressed. Additionally, deferring remediation of the vulnerabilities until the container orchestration platform has been deployed will result in the container orchestration platform (and possibly the IHS) being taken out of service to address the vulnerabilities, thus immediately reducing its availability. Embodiments thus provide capabilities by which container orchestration platform may be utilized in a manner that addresses all known vulnerabilities in the hardware and software configurations that are present in an container orchestration platform installer, thus preventing the container orchestration platform being installed without addressing known vulnerabilities, and thus saving an administrator the time and effort required to determine whether a previously used existing container orchestration platform installer is without vulnerabilities.

As indicated in FIG. 3, in scenarios where identified vulnerabilities in the container orchestration platform installer cannot be remediated and the container orchestration platform installer has been identified as still vulnerable at 355, further use of the container orchestration platform installer with respect to the IHS may be blocked, or at least restricted, at 360. In some instances, repeated attempts may be made to identify available remediation procedures that can used to address identified vulnerabilities and that are available for use on the IHS. However, in scenarios where no remediation procedures are available, embodiments block use of the container orchestration platform installer on the IHS. Embodiments may signal any available error conditions in order to provide notifications of the rejected container orchestration platform installer to administrators, such as via the remote management interface described with regard to FIG. 1. Any files received as part of the container orchestration platform installer are deleted by the remote access controller executing the vulnerability management service integrated into the container orchestration platform installer, and the IHS continues operating according to its existing hardware and software configurations. If the container orchestration platform installer is resubmitted later, the procedures described herein are repeated and the container orchestration platform installer will again be rejected such that the remote access controller executing the vulnerability management service integrated into the container orchestration platform installer blocks all attempts to utilize the container orchestration platform installer. In this manner, datacenter administrators may utilize embodiments of the present container orchestration platform installer, but are assured the update capabilities of the remote access controller executing the vulnerability management service integrated into the container orchestration platform installer will reject the container orchestration platform installer if it includes, or its execution to install the container orchestration platform on the IHS would result in, known vulnerabilities. The installation of a container orchestration platform using the container orchestration platform installer that includes, or would result in, known vulnerabilities can be initiated, but it cannot be completed. In this manner, an IHS may be prevented from being administered using a container orchestration platform installer that includes, or would result in, known vulnerabilities.

In accordance with the foregoing, embodiments of the present vulnerability proofing of container orchestration platform deployment avoid potential vulnerabilities in the physical server(s) while installing the container orchestration platform (e.g., k8s) on the server(s), through an automated process that addresses vulnerabilities while installing the container orchestration platform. Thereby, embodiments of the present vulnerability proofing of container orchestration platform deployment provides assurance to users that the container orchestration platform environment is safe from known vulnerabilities.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations. It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The invention claimed is:

1. An Information Handling System (IHS) comprising:
one or more CPUs utilizing one or more buses that connect to a plurality of hardware components of the IHS; and
a remote access controller supporting remote management of the Information Handling System (IHS), the remote access controller comprising a logic unit and a memory device having instructions stored thereon that, upon execution by the logic unit, cause the remote access controller to:
detect a container orchestration platform installer comprising vulnerability management service instructions; and
execute the vulnerability management service instructions, which causes the remote access controller to:
identify configurations for one or more of the plurality of hardware components of the IHS in the container orchestration platform installer;
access a plurality of catalogs specifying known vulnerabilities of hardware components;
determine whether any of the one or more of the hardware component configurations in the container orchestration platform installer are identified as vulnerable in one or more of the catalogs; and
block use of the container orchestration platform installer by the IHS until the hardware component configurations within the container orchestration platform installer are modified to include no configurations with vulnerabilities identified in the plurality of catalogs.

2. The IHS of claim 1, wherein the plurality of catalogs comprises a catalog of hardware component vulnerabilities known to a manufacturer of the IHS.

3. The IHS of claim 2, wherein the plurality of catalogs comprises a catalog of hardware component vulnerabilities known to a manufacturer of one or more of the plurality of hardware components of the IHS.

4. The IHS of claim 1, wherein execution of the vulnerability management service instructions further causes the remote access controller to identify, within a factory provisioned identity certificate of the IHS, one or more vulnerability proofing requirements for the IHS.

5. The IHS of claim 4, wherein the factory-provisioned identity certificate comprises digital signatures for authenticating instructions used by one or more of the hardware components of the IHS.

6. The IHS of claim 4, wherein the vulnerability proofing requirements in the inventory certificate further specify the plurality of catalogs of known vulnerabilities for use in identifying hardware component configurations that are vulnerable.

7. The IHS of claim 1, wherein execution of the instructions further causes the remote access controller to notify an administrator for each blocked use of the container orchestration platform installer due to configurations with vulnerabilities.

8. The IHS of claim 1, wherein the configurations of the container orchestration platform installer comprise a firmware update for instructions used to operate one of the hardware components.

9. The IHS of claim 8, wherein the vulnerability catalogs specify an alternate firmware version that is used to operate the hardware component and that is not associated with known vulnerabilities.

10. A method for vulnerability proofing container orchestration platform deployment on an Information Handling System (IHS), the vulnerability proofing implemented by a remote access controller of the IHS that provides remote management of the IHS, the method comprising:
detecting a container orchestration platform installer comprising configurations for one or more of a plurality of hardware components of the IHS and vulnerability management service instructions; and
executing the vulnerability management service instructions, comprising:
accessing a plurality of catalogs specifying known vulnerabilities of hardware components of the IHS;
determining whether any of the one or more of the configurations for one or more of a plurality of hardware components of the IHS in the container orchestration platform installer are identified as vulnerable in one or more of the catalogs; and
blocking use of the container orchestration platform installer by the IHS until the hardware component configurations within the container orchestration platform installer are modified to include no configurations with vulnerabilities identified in the plurality of catalogs.

11. The method of claim 10, wherein the plurality of catalogs comprises a catalog of hardware component vulnerabilities known to a manufacturer of the IHS.

12. The method of claim 11, wherein the plurality of catalogs comprises a catalog of hardware component vulnerabilities known to a manufacturer of one or more of the plurality of hardware components of the IHS.

13. The method of claim 10, further comprising identifying one or more vulnerability proofing requirements for the IHS within a factory provisioned identity certificate of the IHS.

14. The method of claim 13, wherein the factory-provisioned identity certificate is cryptographically bound to the remote access controller of the IHS.

15. The method of claim 13, wherein the validation proofing requirements further specify the plurality of catalogs of known vulnerabilities for use in identifying hardware component configurations that are vulnerable.

16. The method of claim 10, wherein the vulnerability catalogs specify workload configurations with alternate firmware versions that are not associated with known vulnerabilities.

17. A remote access controller supporting remote management of an Information Handling System (IHS), the remote access controller comprising a memory device having instructions stored thereon that, upon execution by a logic unit, cause the remote access controller to:
  detect a container orchestration platform installer comprising configurations for one or more of a plurality of hardware components of the IHS and vulnerability management service instructions; and
  execute the vulnerability management service instructions, which causes the remote access controller to:
    access a plurality of catalogs specifying known vulnerabilities of hardware components;
    determine whether any of the one or more of the hardware component configurations in the container orchestration platform installer are identified as vulnerable in one or more of the catalogs; and
    block use of the container orchestration platform installer by the IHS until the hardware component configurations within the container orchestration platform installer are modified to include no configurations with vulnerabilities identified in the plurality of catalogs.

18. The remote access controller of claim 17, wherein the plurality of catalogs comprises a catalog of hardware component vulnerabilities known to a manufacturer of the IHS.

19. The remote access controller of claim 17, wherein the plurality of catalogs comprises a catalog of hardware component vulnerabilities known to a manufacturer of one or more of the plurality of hardware components of the IHS.

20. The remote access controller of claim 17, wherein execution of the vulnerability management service instructions further causes the remote access controller to identify one or more vulnerability proofing requirements for the container orchestration platform installer within a factory provisioned identity certificate of the IHS.

* * * * *